(12) United States Patent
Sieling

(10) Patent No.: US 10,203,236 B2
(45) Date of Patent: Feb. 12, 2019

(54) METERING OF GRANULAR MATERIALS INCLUDING SEEDS

(71) Applicant: ROTACON ENGINEERING LIMITED, Onerahi (NZ)

(72) Inventor: Nicolaas Laurisse Sieling, Onerahi (NZ)

(73) Assignee: ROTACON ENGINEERING LIMITED, Onerahi (NZ)

(*) Notice: Subject to any disclaimer, the term of this patent is extended or adjusted under 35 U.S.C. 154(b) by 0 days.

(21) Appl. No.: 15/513,302

(22) PCT Filed: Sep. 15, 2015

(86) PCT No.: PCT/NZ2015/050147
§ 371 (c)(1),
(2) Date: Mar. 22, 2017

(87) PCT Pub. No.: WO2016/048164
PCT Pub. Date: Mar. 31, 2016

(65) Prior Publication Data
US 2017/0307430 A1    Oct. 26, 2017

(30) Foreign Application Priority Data

Sep. 22, 2014  (NZ) .......................... 700269

(51) Int. Cl.
*G01F 15/14*    (2006.01)
*B65D 83/06*    (2006.01)
(Continued)

(52) U.S. Cl.
CPC ............... *G01F 15/14* (2013.01); *A01C 7/16* (2013.01); *A01C 15/122* (2013.01); *B65D 83/06* (2013.01); *A01C 7/04* (2013.01); *Y02P 60/214* (2015.11)

(58) Field of Classification Search
CPC .......... G01F 15/14; B65D 83/06; A01C 7/16; A01C 15/122; A01C 7/04; Y02P 60/214
See application file for complete search history.

(56) References Cited

U.S. PATENT DOCUMENTS 3,951,306 A * 4/1976 Ernst ..................... A01C 7/04
                                                    111/164
3,999,690 A * 12/1976 Deckler ................ A01C 7/046
                                                    111/63
(Continued)

FOREIGN PATENT DOCUMENTS

GB         1421847        1/1976

OTHER PUBLICATIONS

International Search Report, PCT/NZ2015/050147, dated Nov. 30, 2015.

*Primary Examiner* — Frederick C Nicolas
(74) *Attorney, Agent, or Firm* — Young & Thompson

(57) ABSTRACT

Wheat or other granular, flowable material is supplied from a metering hopper at a controlled rate through a limiting aperture at a base of a hopper side wall. A moving surface which has served as a floor of the hopper emerges through the aperture, carrying a covering of material out and toward a material disposal area and is then recirculated into the hopper. The moving surface is a repeatedly used upper surface of a disc or cone that is rotated by a motor. Supply of material is immediately varied by varying the speed of the moving surface.

16 Claims, 4 Drawing Sheets

Figure 1A:
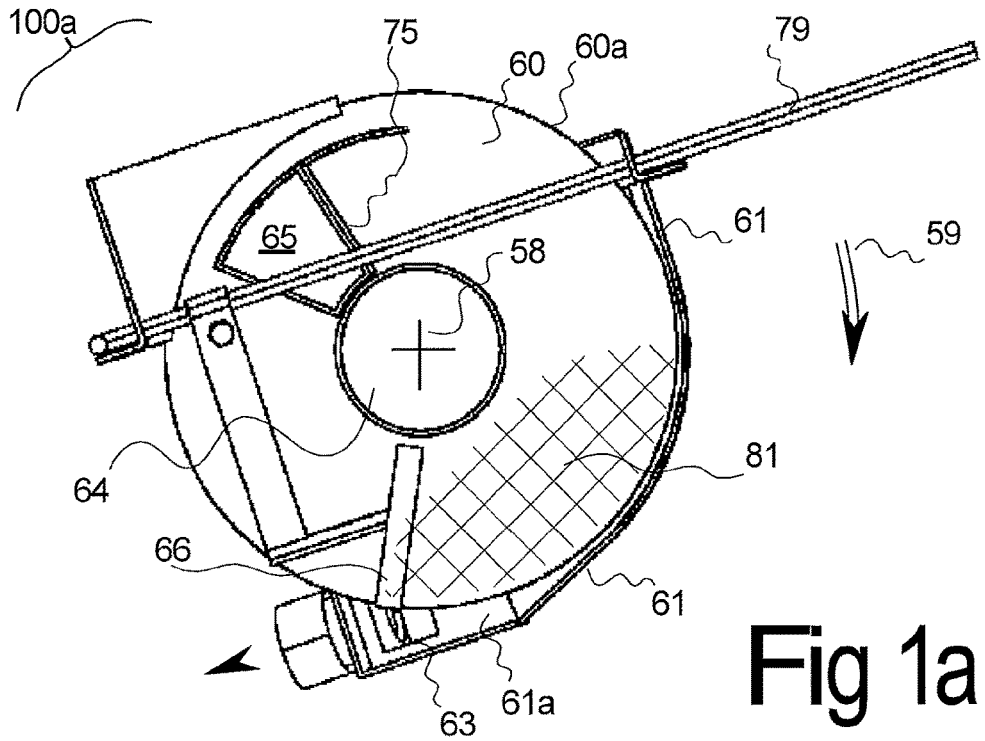

(51) Int. Cl.
    *A01C 15/12*     (2006.01)
    *A01C 7/04*     (2006.01)
    *A01C 7/16*     (2006.01)

(56) References Cited

U.S. PATENT DOCUMENTS

| | | |
|---|---|---|
| 4,776,519 A | 10/1988 | Zweegers |
| 5,732,652 A | 3/1998 | Allen |
| 6,481,647 B1 | 11/2002 | Keaton et al. |
| 7,222,583 B2 * | 5/2007 | Foster .................. A01K 5/0225 119/57.91 |

* cited by examiner

METERING OF GRANULAR MATERIALS INCLUDING SEEDS

FIELD

This invention relates to materials handling in relation to metering out granular solid materials comprising a fluent mass, for which applications include agricultural machinery of the type known as air seeders, such as for implanting seeds at a metered rate on to or into soil.

CROSS-REFERENCE

The apparatus described herein may form part of an agricultural machine, further components of which are described in the applicant's priority patent applications: NZ 700270 and 700271.

Definitions

Agricultural machine: In the present context this term refers to often large powered apparatus for performing work upon a field; such as grading and levelling the soil, implanting seeds and fertilizer, or mowing and harvesting.

Air seeder: This is a variant of a seed drill; which is an agricultural machine capable of placing seeds on or in the soil; often also of placing fertilizer near the seeds. Typically it carries a replicated implanting device; an 'opener"; each one creating a single row of placed seeds.

Angle of Repose "The angle of repose or the critical angle of repose of a granular material is the steepest angle of descent or dip relative to the horizontal plane to which a material can be piled without slumping. At this angle, the material on the slope face is on the verge of sliding." (http://en.wikipedia.org/wiki/Angle_of_repose) downloaded on 1 Sep. 2014. For wheat, one measure of the angle is 27 degrees. For clover seed: 28 degrees.

Floor: The apparatus employs a movable lowest surface inside a hopper. It is convenient to think of this as a supporting floor capable of conveying the granular contents of the hopper even though it does not contribute to the structure of the hopper itself.

Granular Material: In Wikipedia, the "granular material" definition as downloaded on 4 Sep. 2015 is quite useful: A granular material is a conglomeration of discrete solid, macroscopic particles characterized by a loss of energy whenever the particles interact (the most common example would be friction when grains collide). A size range is from one micron up to asteroids and icebergs. In this application "granular material" is defined as the substances which may be metered or handled by the metering device may be defined as any free-flowing solid material that exhibits an Angle of Repose when deposited in a mass and is comprised of solid particles, selected from a range including but not limited to the following examples:
  a. seeds: canola (rape), wheat and other cereals, maize, legumes including peas;
  b. processed materials: animal and poultry feeds, food for humans, sugar, chemicals, pills, tablets, and granulated fertilisers
  c. minerals including salt; ores, and fuels including coal; sand, gravel, stones and rocks (preferably graded).
  d. Powders may be flowable and hence suitable.

Metered amount: refers to a controlled quantity or volumetric amount per unit time

BACKGROUND

The improvement to be described in this application was originally devised for the purpose of accurate metering of seed (and/or fertiliser) within an agricultural seeding or sowing machine (herein called a "Seed Drill" or "air seeder") that creates rows of planted seeds over a field. In many countries, cultivation of food plants is practiced on a large scale. For example, Australia grows about 26 million tonnes of wheat each year; the actual amount being somewhat dependent on conditions. China grows about 10 times as much, though under more intensive management. The inventor has developed some improvements to machinery intended to be towed behind a sufficiently powerful tractor across a field, while providing controlled seed spacing, row spacing, fertiliser depth, seed depth, and fertiliser amount.

An air seeder includes storage means or hoppers for seeds and usually also for concurrently applied fertiliser. Typically it has number of units called openers, each including a fertiliser tine to cut into the soil and discharge granular material beneath the soil surface. A following seed tine is used to cut into the soil and discharge seeds. Refer to the web site www.ausplow.com.au/prod/_info/how and similar pages for an introduction to current technology (downloaded on 31 Aug. 2014). Another useful background document is "An Investigation of air seeder component characteristics" at http://www1.agric.gov.ab.ca/$department/deptdocs/nsf/all/eng8060, downloaded on 2 Sep. 2014. Problems may be exacerbated when the air seeder is scaled up, having perhaps 20 openers on each side of a drawbar, each provided with a seed tine. If rows are missed or under-filled the crop yield cannot reach an optimum, while if the seeds are placed too close together they compete for nutrients, water and light. Again, the crop yield cannot reach an optimum. Likewise, too little or too much fertiliser reduces optimums. Therefore, metering of inputs is an important aspect of a cropping operation.

Seed flow sensors to monitor the process near the point of deposition are known, and are retained in this invention. It is highly preferable to provide an air seeder that will run for long periods without interruption for optimised machine, seed and operator productivity. Problems arising in existing apparatus include irregular seed spacing along a row; often because a metering mechanism inside the machine becomes unreliable, perhaps being clogged by wet or hygroscopic materials, or litter, and fails to deliver seeds at a suitable rate into the associated seed tine. The same problems may also occur in relation to metered fertiliser.

The prior art includes some consideration of accurate metering of seed (and/or fertiliser) for an air seeder. This problem has been addressed in a number of ways, as reviewed in "An Investigation of Air Seeder Component Characteristics" (see above).

In Australia it is a common practice to rotate crops; advantages include improved weed and disease control. One preferred 4-season rotation scheme is three seasons of wheat, then one season of canola. Agricultural machinery that can be switched between sowing wheat and sowing canola would be useful. Yet the seed sizes are very different. Also, sowing rates are different. Wheat is typically applied at 100 kg/ha whereas canola is applied at 3 kg/ha. A further problem to be solved within this invention is to provide a sowing machine capable of being set up for sowing "normal seeds" such as wheat, and "fine seeds" such as canola as the occasion demands.

PRIOR ART

CA 1159313 describes a seed metering device for an air seeder, in which a horizontally disposed looped belt made of an open-mesh metal construction traverses an aperture in a floor of a hopper and returns. Flow during use of granular material such as seeds is controlled by position of an adjustably placed plate entering the aperture area from a side to cover less or more of the aperture. A second, fixed plate placed under the belt and across the aperture acts as a floor to prevent material falling straight through the belt when the belt is not moving. Material is dragged across the fixed plate, on or within the mesh of the belt, and then drops off a slanted edge of the fixed plate. Material also falls through the returning part of the belt.

The present application provides that the material to be metered such as seeds is carried on a continuous non-permeable surface laterally out of the metering hopper through an aperture. Flow is controlled by the rate of motion of the carrying surface, and dimensions of the exit aperture. The carrying surface is a single, non-perforated rotating part. The present application is capable of replacing the metering system of CA 1159313 with a system having greater simplicity, lower power consumption, and improved reliability.

Object

An object of the present application is to provide an improved apparatus for controlled delivery of granular material, more particularly for seed transfer within agricultural crop sowing 100 machinery including air seeders, optionally also for fertiliser transfer within crop sowing machinery, or at least to provide the public with a useful choice.

SUMMARY OF INVENTION

In a first broad aspect the invention provides a metering mechanism providing a metered supply from inside a hopper (65) of a granular material as previously defined in this specification under "Granular Material"; wherein a portion of a laterally movable, continuous carrying surface (60) comprises a floor (62) of the hopper (65); the hopper has sides including an outflow side wall (65a) provided with an outflow aperture (75) having an upper boundary comprised of an underneath edge of the outflow side wall (65a); the outflow aperture having a width and having a lower laterally movable boundary comprised of the carrying surface (60) which is extended 110 beyond the outflow aperture and separated from the upper boundary of the outflow aperture by a height of the outflow aperture.

Preferably the carrying surface (60) is comprised of a rotatable surface; either a flat (56) or a conical (57) disc; the carrying surface having an axis of rotation (58), an edge (60a), and a direction of rotation (59 or 59') about the axis; the carrying surface including a portion (62) serving as the hopper (65) floor while maintaining a sealing contact with dependent portions of the hopper side walls except at the outflow aperture, a portion forming a lower boundary of the outflow aperture (75) and extended from the outflow aperture in an outflow direction and into a discharge area (81), and a remaining portion of the carrying surface located between the discharge area and the hopper floor, so that, when in use, rotation of the disc causes the carrying surface (60) to sequentially (a) maintain sliding contact with dependent portions of the hopper side walls excluding the outflow aperture (75) while (b) traversing the interior of the hopper in contact with the material to be metered; (c) leave the hopper (65) in an outflow direction at the outflow aperture while retaining on the carrying surface a covering comprising a metered amount of granular material from within the hopper; (d) carry the metered amount of the granular material into a discharge area (81) and discharge the metered amount of the granular material toward the receiving means (63) disposed beyond the edge (60a) of the surface and inside a guide (61) before (e) returning to re-enter the hopper as the floor.

In one option the disc rotates in a clockwise direction as seen from above.

In a second option, the disc rotates in an anticlockwise direction as seen from above.

Optionally the flat (56) or conical (57) disc is provided with a roughened carrying surface (60).

Also optionally the flat (56) or conical (57) disc is provided with a replaceable carrying surface (60).

In a further option, the carrying surface (60) of the flat (56) or conical (57) disc is comprised of a first or surface material coated on to a substrate comprised of a second material.

In a related aspect, a rate of supply of the metered supply of a granular solid material from the hopper is controllable by adjustment of the dimensions of the outflow aperture (75).

Preferably the outflow aperture height is adjustable.

Preferably the selected height is at least sufficient to admit granules of the granular material.

More particularly, the rate of supply of a granular solid material from the hopper is controlled, when in use, by the controlling the rotational speed of the flat (56) or conical (57) disc; where speed may be varied instantaneously during use.

In a supporting aspect, the axis of rotation (58) of the flat (56) or conical (57) disc is oriented with respect to a direction of gravity in order to maintain the discharge area (81) of the carrying surface at a slanted angle to a vertical axis, thereby, when in use, tending to cause at least some of the covering of the granular solid material to fall toward and from the perimeter (60a) of the surface after leaving the aperture, and be received by the receiving means (63).

Preferably an inner edge of the carrying surface is delimited by a raised cylindrical border (64).

Preferably, the covering of the granular solid material is deflected from the discharge area and into the receiving means by a deflection means (66) disposed at an angle to a radius of the flat (56) or conical (57) disc in a position following the discharge area and in wiping contact with the surface of the disc; the deflection means being selected from a range including a solid barrier, a resilient barrier or wiper, and a brush.

Desirably, the receiving aperture exhibits a widening separation (61a) from the edge of the flat (56) or conical (57) disc in the direction of rotation toward the position of the materials deflection means.

Optionally there is no guide (61).

In a dual-supply option an adjacent pair of separate supply hoppers are optionally included; one (65a) beside the other one (65b); each capable when in use of independently supplying a separate granular material on to the carrying surface at a proportional rate—for example, seeds and fertiliser in a fixed proportion.

Alternatively, one of two separate supply hoppers is placed inside the other supply hopper; one capable when in use of supplying a first granular material on to the carrying surface and the other capable when in use of independently supplying a second granular material on to the carrying surface; each at a proportional rate.

In a further option the metering mechanism includes means to accept a reversibly installable accessory (200) for use when sowing fine seeds; the accessory providing (a) an alternative or subordinate hopper maintained at a closer distance above the disc surface, and (b) an added-in sloping guide beyond the perimeter of the rotating disc, providing a narrower yet also widening separation from the disc in the direction of rotation; the reversibly installable accessory being held in place by a reversibly installable fastener.

PREFERRED EMBODIMENT

The description of the invention to be provided herein is given purely by way of example and is not to be taken in any way as limiting the scope or extent of the invention. The invention has been described in an illustrative manner, and it is to be understood that the terminology which has been used is intended to be in the nature of words of description rather than of limitation. Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps.

In this specification, reference numerals, including reference numerals appearing in the Summary of Invention, are provided for clarification only and are not intended to restrict the scope of the invention to the particular embodiments of the components in conjunction with which the reference numerals are used.

Each document, reference, patent application or patent cited in this text is expressly incorporated herein in their entirety by reference. Reference to cited material or information cited in the text should not be understood as a concession that the material or information was part of the common general knowledge or was known in New Zealand, in Australia, or in any other country.

DRAWINGS

FIG. 1 as 1a (clockwise version), 1b (anticlockwise version), 1c (elevation view, 1d (perspective view, showing disc (56)) and 1e (face view showing gate 75) illustrate the metering device.

FIG. 2. as 2a (overall view including canola attachment, and 2b (canola attachment 200).

FIG. 3 as 3a (plan view) and 3b (elevation view). These drawings show a version of the invention using a rotating cone (57) supporting the carrying surface (60).

Figure 4:
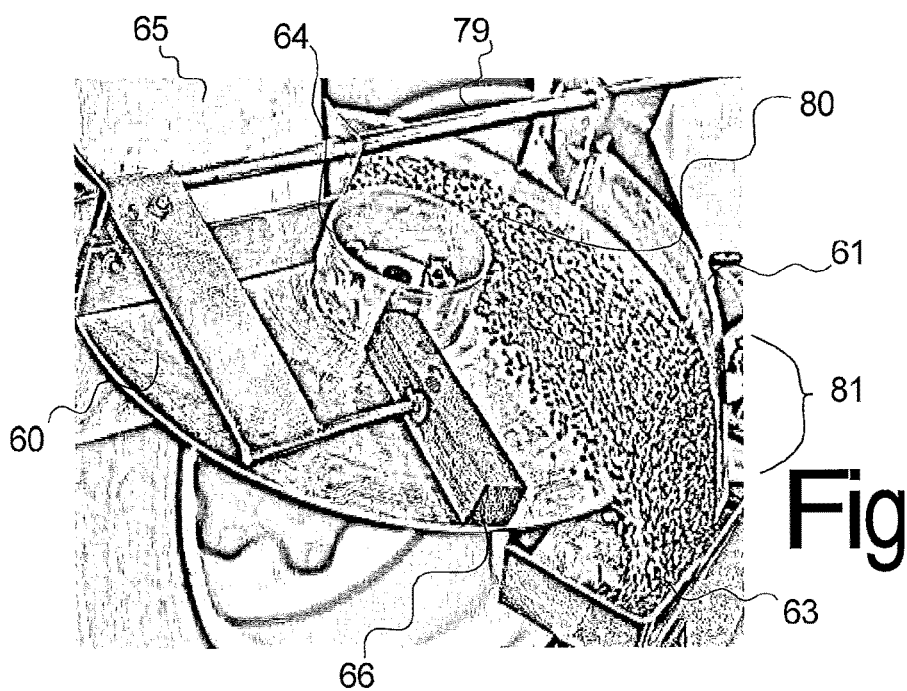

FIG. 4 (from a photograph) shows actual flow of wheat seeds across the disc meter during use.

INTRODUCTION

This invention is described, by way of example only, with reference to an air seeder application although many other applications exist such as in the food manufacturing and general manufacturing industries. An air seeder is an agricultural machine for sowing seeds in a field at an optimal rate and is pulled behind a tractor over a field. Along each side of the central drawbar there are a number of opener units each including tines for implanting seeds and optionally also separate tines for implanting fertiliser. A modern air seeder may have 40 openers.

This specification describes a reliable and effective metering device, intended for the controlled delivery rate of seeds and accompanying fertiliser granules into soil. The mechanism as illustrated in FIGS. 1-5 creates a controlled rate of flow of a bulk, granular material, for instance seeds of a type having a consistent size such as wheat or canola seeds, or fertiliser. This specification notes that when a mass comprised of relatively standardised granules is placed on a surface, a combination of friction and gravity as modulated by a number of factors including granule shape and density, friction, shape and surface area typically results in an angle of repose that is characteristic for each granular material. A definition of a granular material includes that there is energy loss when the material flows. The theory of operation is not advanced, but see Wikipedia, "granular material" as downloaded on 4 Sep. 2015. The angle of repose mechanism may comprise the basis of this invention by creating a volumetric or metered covering on a floor surface (herein called "a carrying surface" (60) caused, when in use, to move at a controlled velocity in a downstream direction from within a hopper having side walls and a top; the base of the hopper being effectively sealed against escape of granules. The seal is formed by a close approach between the walls and the surface except at an aperture along at least part of a downstream wall of the hopper that is spaced apart from the carrying surface by a controlled height.

The height of the aperture has an effect on the rate of flow, for instance a minimum height related to granule size and a maximum height related to angle of repose. The height can be set in order to provide a useful range of metered output over a convenient range of disc revolution rates. The material tends to not flow out of an appropriate aperture unless the floor surface is being moved out through the aperture. Aperture width also has an effect. The concept applies to any upward-facing surface, and could apply to part of a conveyor belt. The inventor has found that a compact and convenient metering device uses a carrying surface upon a flat disc (56) or a conical disc (57) and employs cyclic return and re-use of the same carrying surface (60).

Example 1—Flat-Disc Metering Device

For a practical example, one seed meter handling the selected seed, and one fertiliser meter handling granulated fertiliser is provided on each side of the air seeder draw bar for a total of four metering devices in the air seeder. Each metering device supplies a number of openers as is known in prior-art air seeders with granular materials derived from bulk hoppers at a controlled or metered rate. FIGS. 1a, 1b, 1c 1d and 1e are diagrams to show the principle of the metering device. The seed metering device of Example 1 is able to be switched from one kind of seed to another—such as wheat to canola. Details of the changeover are described below, in relation to FIG. 2. It will be appreciated that the invention does not cingulate individual granules or seeds, but delivers seeds in the form of a covering carpet on the carrying surface (60) at an externally controllable rate in order to provide a desired plant spacing along rows being planted.

The disc is made to rotate around an axis (58) at a moderate, controlled and adjustable speed and emerge from within a metering hopper beneath a side-wall barrier having a gap (75) called the outflow aperture. Granular material such as seeds or fertiliser are supplied from a bulk hopper elsewhere into a metering hopper (65), for which the most dependent part or floor (62), distinctly hatched in FIG. 1d and FIG. 1e is comprised of the carrying surface (60). The floor maintains a sealing contact with the dependent edges of side wall of the hopper, by which we mean that the floor slides beneath the walls but any gap between (apart from the outflow aperture) is too small to release the granular material. Floor (62) supports the granular material inside the hopper. If the carrying surface (60) is stationary the granular material will stabilise as a collected mass (not shown) inside the hopper, resting against the outflow aperture (75) but will not flow out. A possible theory is that the constituent granules become bound to each other by a mechanism related to the cause of the angle of repose phenomenon. The inner aspect of the hopper and the inner boundary of the outflow aperture (75) (see FIG. 1e) is preferably a cylindrical, axially mounted attachment (64) upon the disc, which prevents granules remaining trapped behind a narrower aperture bordered by an inner wall of the hopper. The enclosure or metering hopper (65) is open at the base but the sides are maintained close (as a "sliding seal") to the disc surface (62), so that material is not able to escape other than through the gap (75) beneath outflow barrier (65a). Granular material is drawn out of the hopper upon the carrying surface at a rate proportional to the rate of rotation of the disc, including zero flow if the carrying surface (60) is stationary. The upper limit of the aperture (75) may be a cut through the outflow side of the hopper wall or perhaps is made with a hardened edge so that the apparatus retains calibration for longer.

FIG. 1a is a view from above of a rotatable carrying surface (60), and made to rotate in a direction as shown by the curved arrow (59) at a controlled rate by a conventional prime mover such as a variable-speed DC motor and gear box (not shown), or a hydraulic motor. A prime mover that rotates the disc is externally controlled by, for instance, a computer responsive to tractor position over the field, or by the operator driving the tractor that pulls the air seeder, turning the disc at 10-30 rpm. Centrifugal forces play a small part only in normal use. Since the inventor prefers that the axis (58) of the carrying surface (60) is maintained at a slanted angle such as, but without limitation 30 or 45 degrees, the granules that are drawn through the controlled or outflow aperture (75) tend to slide, roll, or fall over the edge (60a) of the carrying surface (60) from area (81) and enter the diverging channel (61a), where they are trapped by the curved upwardly extending guide (61). The diverging channel is also closed underneath the carrying surface (60) by a fixed metal plate (not shown) that runs under the disc and generally under the zone (81) from the edge guide (61). Diverging spaces are preferred at all sites exhibiting relative motion in order to (for example) avoid trapping and crushing or otherwise breaking apart the granules, especially seeds.

A wiper bar (66) supported from pivotable shaft (79) is maintained in light contact on the carrying surface along or at an angle to a radius line across the carrying surface (60) by its own weight or by spring pressure. Bar (66) has a diverting or cleaning function, in case dust, plant material, or wet granules collect upon the disc surface. A rubber wiper blade might be used. The wiper bar would be necessary if the disc surface was maintained in a horizontal plane. The pivoting shaft allows the entire mechanism including the disc (56) or cone (57) to be swung out of the way for easy access to the bottom of the seed/fertiliser hopper (65) either to empty it or to remove an obstruction. After being wiped the carrying surface continues rotation and returns into the hopper (65). If the disc was operated with a vertical axis, the wiper bar would be required in order to push all carried granules off the carrying surface.

A preferred carrying surface (60) for any particular granular material is selected. For an air seeder, the preferred carrying surface is smooth stainless steel for cleaning and better tolerance to possible chemical attack by some types of fertiliser. The entire disc or cone may be made of a single material such as (but without limitation) metal, plastics, rubber, glass and wood. Optional use of a distinct gripping or hard-wearing surface if necessary might be created by painting, glueing, bolting or other assembly of layers of differing materials, or overmoulding a foundation disc or cone with a plastic or a hard rubber or analogous material. A modified surface may be provided using standard techniques known to those skilled in the art. A replaceable surface is useful to overcome wear of the surface; useful in examples such as where hard, dense rocks are handled.

Figure 1B:
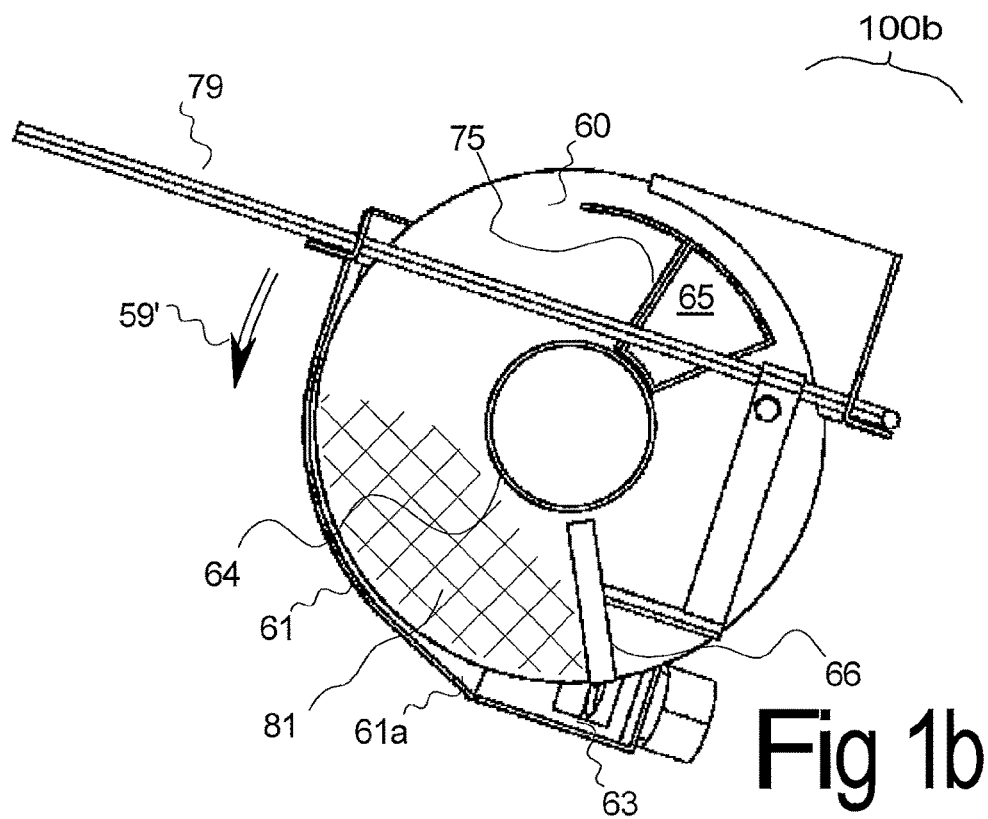
Figure 1C:
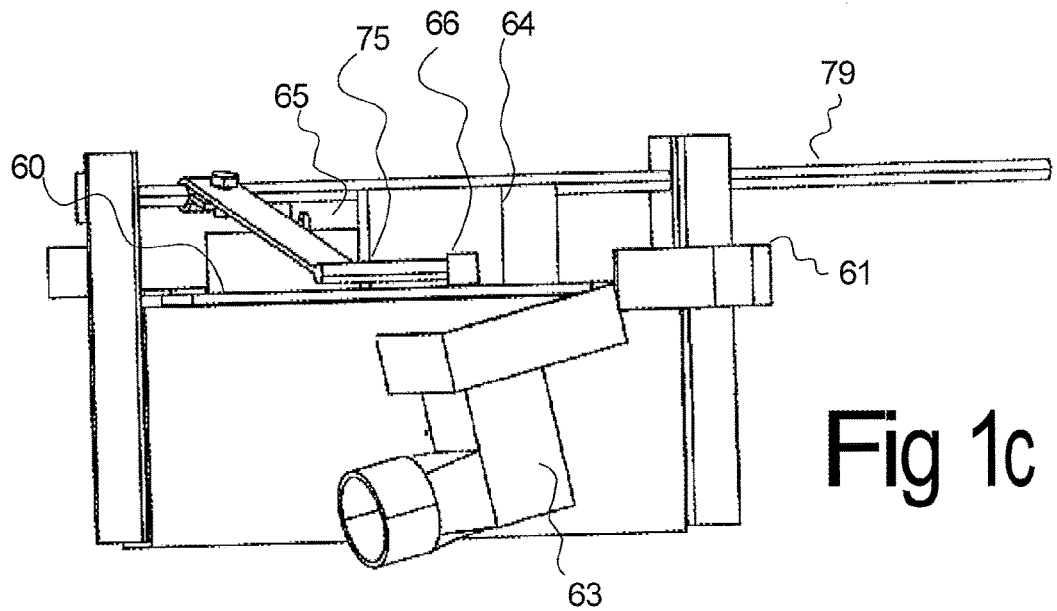
Figure 1D:
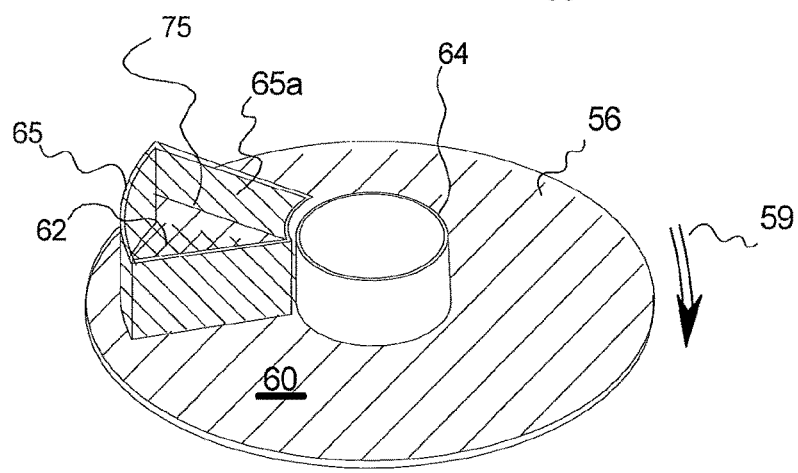
Figure 1E:
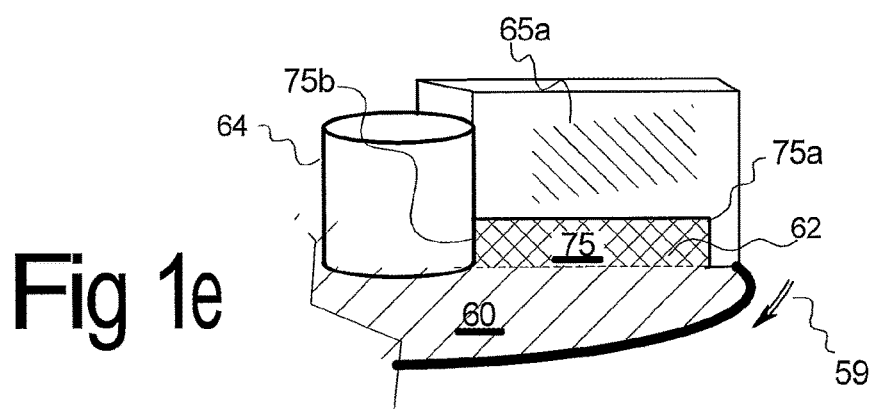

FIG. 1b simply illustrates that the meter using a rotating carrying surface (60) can be constructed in either handedness (clockwise or anticlockwise rotation). In a preferred seed sowing machine there is one seed metering device and one fertiliser metering device mounted from each side of a central drawbar, both rotating clockwise, and a mirrored, second set of devices on the other side of the drawbar, both rotating anticlockwise. For ease of description, and for a disc turning clockwise as in FIG. 1a, we will refer to the parts of the disc as a clock face with the highest part of the disc, when mounted on a slant, being at 12 o'clock. The hopper outlet (65) is located between 9 and 11 o'clock directly over the disc (60). The controlled-size gap (under bar 75) is provided at the 11 o'clock edge of the hopper. Movement of the carrying surface (60) upon the disc causes a layer of granular material to be drawn out from a bulk supply in the hopper upon the carrying surface (60) through the outflow aperture (75).

A fixed, confining guide or band (61) is fixed close to the outer moving edge (60a) and extends from about 3 to 5 o'clock. The band is provided with a plate (obscured) fixed at right angles and extending under and close to the underside of the disc. The carried layer of granular material is conveyed clockwise in a circular motion centered on axis 58 toward the lower half (81) of the disc. It is prevented meanwhile from falling over the edge (60a) of the carrying surface by the guide or band (61) and is prevented from falling across the centre of the disc by an attached cylinder (64). Gravity causes the granular material to fall across the face (81) of the sloping disc and fall toward the lower part of the disc. Most of the granular material is against band (61) by the time it reaches the 5 o'clock position. The diverging gap between band (61) and the edge of the disc (60a) and similarly between the plate under the disc and the underside of the disc increases between 3 and 5 o'clock to prevent granular material being caught and jammed and damaged between the band (61) and the disc, or the under-disc plate and disc as it rotates. A chute (63) is mounted below the disc between 5 and 7 o'clock and the granular material falls off the disc (from area (81)) in this segment. Chute (63) comprises receiving means and leads to the airstream conveying the granular material (seed and fertiliser) about the air seeder. The pivotally mounted wiper arm (66) rests upon the carrying surface (60), from near 6 or 7 o'clock.

FIG. 4 is derived from a photograph taken during a test, showing the path taken by wheat seeds (80) across an inclined, rotating carrying surface (60), falling off a side of the disc from a departure zone (81) and into a chute (63). The seeds emerge from under a barrier (75) (obscured) and flow over and then fall off the disc bearing the "carrying surface" (60). The seeds form an apparently even covering or carpet over the disc after leaving the aperture from the hopper, in accordance with the description earlier in this section.

It is expected that a prior-art venturi arrangement will be used to pick up and pneumatically transport the granules or seeds from the chute (63) to each planting means in the air seeder. Alternatively, the entire metering mechanism may be enclosed in a pressurised vessel for a conventional pressurised bin system, eliminating the need for a venturi entry for the seed into the airstream.

It is expected that a third-party granule or seed monitoring means will monitor passage of particles in the air stream and report all apparent blockages to an operator, so that the potential yield per hectare is maximised and not diminished by missing strips of planted seeds. Typically the direction of the tractor is guided (and usually controlled) by GPS and typically the forward speed of the tractor between the end of field turns is set by the operator with the tractor's cruise control facility. Wheel slippage of the tractor varies with the field conditions (drag from pulling the knives though the soil) and therefore the ground speed is not constant. In computer-controlled seeders a measure of the ground speed is obtained by a ground following wheel, by ground sensing radar or by the GPS itself. The ground speed is feed back to the computer and the disc rotation rate of the seed and fertiliser meters is adjusted accordingly.

Canola Accessory

Figure 2A:
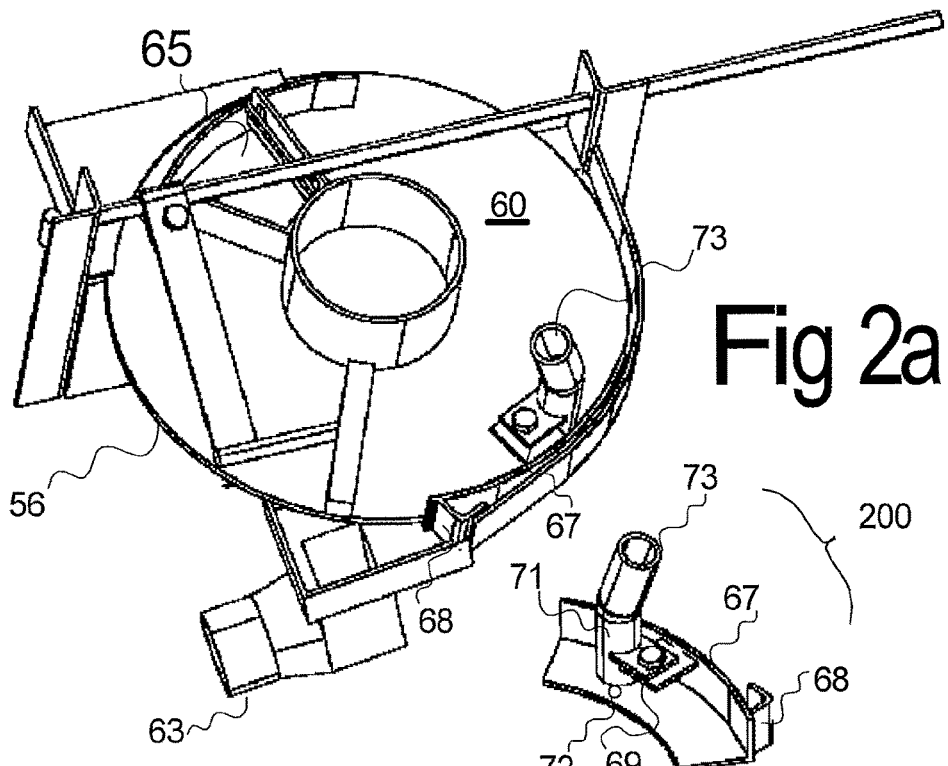
Figure 2B:
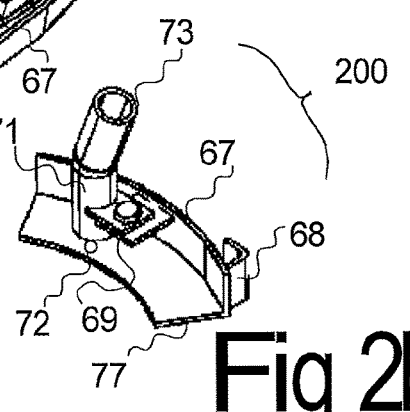

Users of this invention will from time to time also want to meter out finer seeds such as canola, for the purpose of crop rotation, from the same air seeder. FIG. 2b shows a convenient insert or "canola accessory" that may be reversibly bolted into the device shown in FIG. 1 in order to dispense smaller seeds from time to time. FIG. 2a shows the accessory bolted in place, such that the canola-suited spacing between the open end (73) of the accessory and the carrying surface (60) below is preset. The attachment illustrated here is intended for a flat disc version of the metering device. A mounting bracket (68) is fixed to the outside of the additional band (67) to allow the accessory to be attached to the inside of band (61) as described with reference to FIG. 3, so it now forms an extension of band (61) between 4 o'clock and 6.30 (with reference to FIG. 1a). A different supply duct (73) is connected to a hose from a hopper containing the alternative, free flowing small seed such as canola. The supply duct (73) for canola seeds and the tube ending at (72) are functionally equivalent to the hopper for wheat. A partial sector or plate (77) is welded so as to lie under the disc, at right angles to band (67). Again, the gap between band (67 and the edge of disc, and similarly between plate (77) and the underside of the disc increases in the direction of turning, but at a smaller rate than the rate of increase as described above for coarser seed/fertiliser and is located between 4 o'clock and 6.30 around the disc to prevent seed being caught between the band (67) with plate (77) arrangement and the disc (as in FIG. 1 or 3) as it rotates. A tube-holding tab (69) is fixed to the inside of band (67) and a tube (71) is bolted to the tab. The tube (71) terminates at an open end (78) (with a gap, indicated in FIG. 2b as a circle—along the indicating line from (72)) adjacent the disc at (78), using the same principle as for barrier (75) in FIG. 1d, close enough to allow the small seed to fall on to the disc, but not to flow past the orifice of the tube unless the carrying surface (60) is actually rotating. As the disc (60) rotates a layer of seed proportional to the gap between the disc and the end (72) of tube (71) is drawn onto the disc and makes its way to the chute (63). Simply bolting this canola accessory to band (61) and connecting the alternative, free flowing small seed hopper to tube (73) changes the machine to this alternative seed type without further mechanical changes. There is also a bracket (69) for receiving an attachment bolt. The plate (77) is fitted underneath and close to the disc and band (61). Conversion between peas and wheat is likewise facilitated. Optional ways to permanently include a canola hopper along with the hopper set up for wheat-sized granules include placing the canola hopper inside or beside the wheat hopper. An air seeder operator may prefer not to repeatedly convert the machine from canola to wheat for specific fields, since any one faint is likely to have separate fields planted in each species, under rotation. Alternative canola hoppers are described below.

Example 2—Cone-Shaped Metering Device

In the preceding Example the invention relied on a flat disc (56) best seen in FIG. 1d as the "carrying surface" of the invention, rotating about a preferably slanted axis in relation to a horizontal plane, so that the granules or seeds taken from the hopper by the metering process will tend to migrate or roll off the lower edge of the disc and be carried away as in FIG. 4.

Figure 3A:
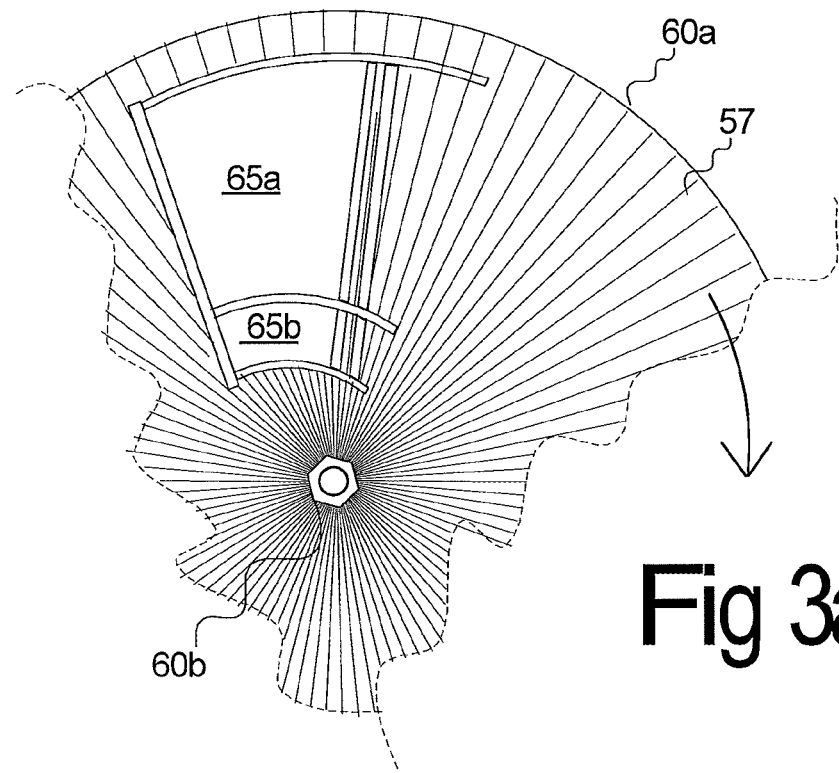
Figure 3B:
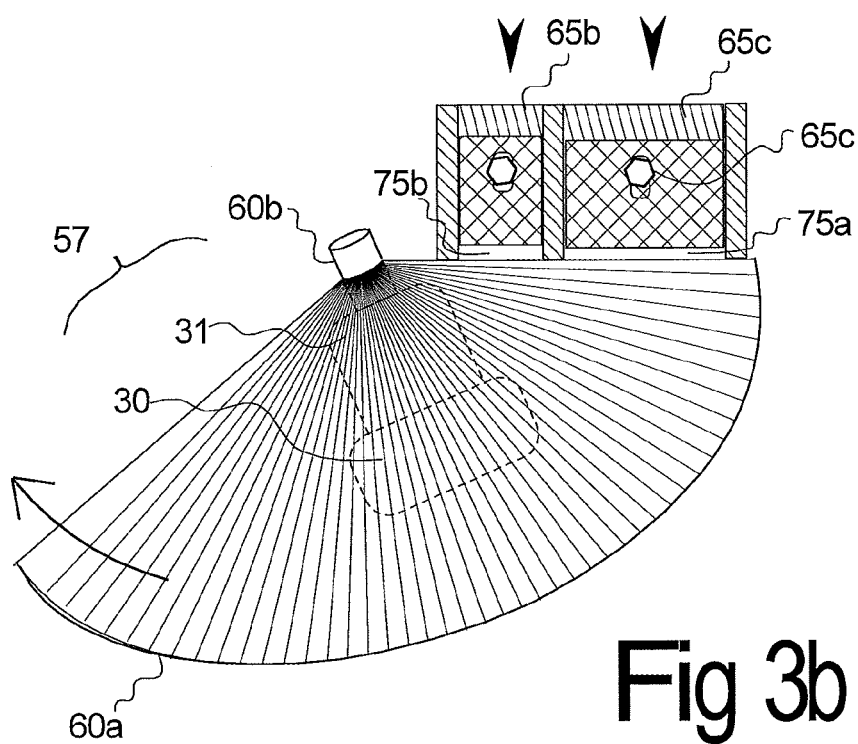

See FIG. 3a, a plan view of part of the cone (57) that, in this variation, replaces the flat disc (60) of FIGS. 1 and 2. A cone, especially a cone having a curved radial profile, is stronger than a flat disc of the same thickness. The outer or convex side of the cone is employed. Its profile has perhaps 150 degrees as an internal angle, although the optimum is yet to be determined. The cone (57) has a straight profile along a radius and in FIG. 3b, but a curved (or part-spherical) radius profile is acceptable as long as the corresponding surfaces of the hopper walls remain sealed and the wiper conforms. The carrying surface draws granular material from—in this case—two hoppers (65a, 65b) when rotated, as previously described in this section. FIG. 3b is an elevation view. The periphery of the carrying surface over the cone is (60a). The centre is attached to a shaft (60b) turned by a variable-speed electric motor (30) and reduction gearbox (31), or a hydraulic motor equivalent as previously described in this section, shown here as dashed lines since they are concealed inside the cone. Orientation of the axis of the gearbox or drive shaft provides either a disc or the cone covered with the carrying surface with a preferred attitude. A drive linked to a ground wheel could be used. The part of the cone that is at any moment in time directly under the wheat hopper (65a) and under the canola hopper (65b) is best placed slightly on the rising side of a level part. If the aperture opens over a downwardly sloping part it might leak at times when the cone has stopped. During rotation the previously level part of the cone (57) inherently assumes a progressively steeper slope down toward the chute (63) (in comparison with a flat disc), encouraging the granular material to fall off the side of the cone, against a side barrier (61a) and into the chute arrangement indicated at (63b).

The cone option in FIG. 3b shows a convenient way to mount two metering hoppers permanently in place and side by side. In a variation suited for other planting purposes, fertiliser, if compatible, may be dispensed from hopper (65b) simultaneously with seeds from hopper (65a) so that they become mixed while being carried to the planting units. Or, one hopper can be declared as the canola hopper (65b) and the other, the wheat hopper (65a) and used at different times. In FIG. 3b, each hopper (65a) and (65b) is shown fitted with an adjustable height barrier, adjusted using fixing bolts (65c). As for Example 1, each kind of granular material, which has a characteristic angle of repose, is allowed to flow against a barrier of a selected height and width. Variable-height gaps (75a) and (75b) are shown in FIG. 3b. Dimensions are not specified here since a little experimentation is required. The canola metering hopper could be located within (inside) the wheat hopper. Since it is fed from a different supply pipe, the changeover is made to happen externally, by changing which seed is sent to the metering hopper combination.

Variations

Applications: the invention, although originally developed for use in seed drill type machinery wherein either wheat or canola seeds, or granulated fertiliser, may be used in many applications, wherever granular solid material is to be dispensed at a controlled and steady rate. For example, in continuous baking such as for handling grain or other granular material; to dispense sugar, flour, and whole grains, to dispense pills, or to handle graded road metal when surfacing a road.

In another option, no collecting barrier around the disc (56) or cone (57) is provided. The metered material is simply allowed into a chute sufficiently large to catch it all.

The metering device is simple enough that it could be replicated to give one metering device per opener—for a total of perhaps 40×2 openers per air-seeding machine, so as to overcome "distribution variations after metering" that may occur within existing Air seeders. One concept is to provide a plurality of disc systems each having a variable speed motor driven within a feedback loop that maintains a supply of a seed or granule output at a required rate to a tine assembly as detected by a third-party granule or seed flowmeter monitoring means. The device may supply granules at a constant rate, or more preferably in proportion to a machine velocity over the ground. Then, each disc system supplies an adjacent tine with a regulated amount of either fertiliser or seeds, while receiving an unregulated excess supply into its subordinate hopper, which can reliably be distributed. Such extra care could provide a 2-5% improvement in seeding accuracy.

Industrial applications that convey hard materials away from hoppers may use metering apparatus according to the invention, including hardened durable surfaces on discs or cones used to meter the hard materials though the outflow aperture of the hopper, and drop them on to a conventional conveyor where hardness is sacrificed for flexibility.

Results and Advantages

The mechanism for metering out granular material in a volumetric manner as described in the various Examples of this application provides at least these advantages:

It has a consistent physical basis of operation, being at least partly based on an angle of repose for the material. Its metering rate can be varied instantaneously. Operation requires a lower power input than the prior art, and it can be lighter. It is much less subject to moisture related (hygroscopic) or any other blockages. The moving part has relatively low load forces. There is no need for mechanical protection like shear pins or slip-clutches. It needs little maintenance. Apart from the aperture dimensions, it has no parts that can wear and affect the accuracy of the seed/fertiliser delivery. It is inexpensive to build.

It can be readily and reversibly adapted to handle small free flowing seed such as canola.

It can be scaled in order to handle granular materials outside the range of seeds; for instance graded rocks, gravel or sand, coal, pills or pellets, or mineral ores.

Finally it will be understood that the scope of this invention as described and/or illustrated herein is not limited to the specified embodiments. Those of skill will appreciate that various modifications, additions, known equivalents, and substitutions are possible without departing from the scope and spirit of the invention as set forth in the following claims.

I claim:

1. A metering mechanism providing a metered supply from inside at least one metering hopper of a granular material that is a free-flowing solid material comprised of solid particles, selected from seeds including canola, wheat and other cereals, maize, legumes including peas, processed materials including animal and poultry feeds, food for humans, sugar, chemicals, pills, tablets, and granulated fertilisers, minerals including salt, ores, and fuels including coal, sand, gravel, stones and rocks, and flowable powders, wherein a portion of a laterally movable, continuous carrying surface including a floor of the at least one hopper, the hopper having sides including an outflow side wall provided with an outflow aperture having an upper boundary comprised of an underneath edge of the outflow side wall, the outflow aperture having a width and having a lower laterally movable boundary comprised of the carrying surface which is extended beyond the outflow aperture and separated from the upper boundary of the outflow aperture by a height of the outflow aperture, the carrying surface being comprised of a surface of a flat or conical rotatable disc, the carrying surface having an axis of rotation, an edge, and a direction of rotation about the axis of rotation, the carrying surface including a portion serving as the hopper floor while maintaining a sealing contact with dependent portions of the hopper side walls except at the outflow aperture, said outflow aperture being disposed along a radius of the rotatable disc, and a portion of the carrying surface forming a lower boundary of the outflow aperture and being movable, when in use, out from the outflow aperture in an outflow direction and into a discharge area.

2. The metering mechanism as claimed in claim 1, wherein, when in use, rotation of the rotatable disc causes the carrying surface to maintain a sliding contact with dependent portions of the hopper side walls excluding the outflow aperture, while traversing the interior of the hopper in contact with the material to be metered, leaving the hopper at the outflow aperture in an outflow direction while retaining on the carrying surface a covering comprising a metered amount of granular material drawn from within the hopper, and carry the metered amount of the granular material into the discharge area and discharge the metered amount of the granular material toward a receiving portion disposed beyond the edge of the carrying surface and inside a guide before returning to re-enter the hopper as the floor.

3. The metering mechanism as claimed in claim 2, wherein the flat or conical disc is provided with a roughened carrying surface.

4. The metering mechanism as claimed in claim 2, wherein the flat or conical disc is provided with a replaceable carrying surface.

5. The metering mechanism as claimed in claim 2, wherein the carrying surface is comprised of a first or surface material coated n t onto a substrate comprised of a second material.

6. The metering mechanism as claimed in claim 2, wherein a rate of supply of the metered supply of a granular solid material from the hopper is controllable by adjustment of the dimensions of the outflow aperture.

7. The metering mechanism as claimed in claim 2, wherein an inner edge of the carrying surface is delimited by a raised cylindrical border.

8. The metering mechanism as claimed in claim 2, wherein the rate of supply of a granular solid material from the hopper is controlled, when in use, by controlling the rotational speed of the flat or conical disc.

9. The metering mechanism as claimed in claim 8, wherein the axis of rotation of the flat or conical disc is oriented with respect to a direction of gravity in order to maintain the discharge area of the carrying surface at a slanted angle to a vertical axis, thereby, when in use, tending to cause at least some of the covering of the granular solid material to fall toward and from the edge of the carrying surface after leaving the aperture, and be received by the receiving portion.

10. The metering mechanism as claimed in claim 9, wherein the covering of the granular solid material is deflected from the discharge area and into the receiving portion by a deflection device disposed at an angle to a radius of the flat or conical disc in a position following the discharge area and in wiping contact with the surface of the disc, the deflection device being selected from one of a solid barrier, a resilient barrier, a wiper, and a brush.

11. The metering mechanism as claimed in claim 10, wherein the receiving aperture exhibits a widening separation from the edge of the flat or conical disc in the direction of rotation toward the position of the materials deflection device.

12. The metering mechanism as claimed in claim 1, wherein the metering mechanism is provided without a guide.

13. The metering mechanism as claimed in claim 11, wherein the at least one hopper includes an adjacent pair of separate supply hoppers one of the supply hoppers being provided beside the other supply hopper, each of the supply hoppers being configured, when in use, of independently supplying a separate granular material onto the carrying surface at a proportional rate.

14. The metering mechanism as claimed in claim 11, wherein the at least one hopper includes two separate supply hoppers, one of the two separate supply hoppers being disposed inside the other supply hopper, one of the supply hoppers being configured, when in use, of supplying a first granular material on to the carrying surface, and the other of the supply hoppers being configured, when in use, of supplying a second granular material onto the carrying surface, each of the supply hoppers supplying the respective first and second granular material at a proportional rate.

15. The metering mechanism as claimed in claim 11, further comprising an accessory receptor portion configured to accept a reversibly installable accessory for use when sowing fine seeds, the accessory providing an alternative or subordinate hopper maintained at a closer distance above the disc surface, and an added-in sloping guide beyond the perimeter of the rotating disc, providing a narrower yet also widening separation from the disc in the direction of rotation, the reversibly installable accessory being held in place by a reversibly installable fastener.

16. The metering mechanism as claimed in claim 10, wherein the receiving aperture exhibits a widening separation from the edge of the flat or conical disc in the direction of rotation toward the position of the materials deflection device.

* * * * *